United States Patent [19]
Sassone et al.

[11] Patent Number: 5,656,986
[45] Date of Patent: Aug. 12, 1997

[54] BISTABLE ACTUATOR DEVICE

[75] Inventors: Luigi Sassone, Casale Monferrato; Daniele Cerruti, Caresana, both of Italy

[73] Assignee: Eltek S.p.A., Casale Monferrato, Italy

[21] Appl. No.: 365,476

[22] Filed: Dec. 28, 1994

[30] Foreign Application Priority Data

Dec. 29, 1993 [IT] Italy ................................ T093A1005

[51] Int. Cl.$^6$ .................................................. H01H 61/06
[52] U.S. Cl. .............................. 337/116; 337/140; 337/73
[58] Field of Search ................................. 337/116, 140, 337/3, 62, 72, 73

[56] References Cited

U.S. PATENT DOCUMENTS 3,622,929  11/1971  Barden ........................ 338/162
3,743,179   7/1973  Grayson ...................... 337/304
4,544,988  10/1985  Hochstein ................... 337/140
4,819,868   4/1989  Fornasari .
5,222,277   6/1993  Harvey .

*Primary Examiner*—Lincoln Donovan
*Attorney, Agent, or Firm*—Herbert Dubno

[57] ABSTRACT

An actuator device varies its functional condition from a state of rest to a working state, both stable and has a body receiving a thermal actuator, an electric heater, electric contacting elements and a transmission shaft for the thrust generated by the actuator. A bistable kinematic mechanism uses inclined planes and/or cams.

10 Claims, 3 Drawing Sheets

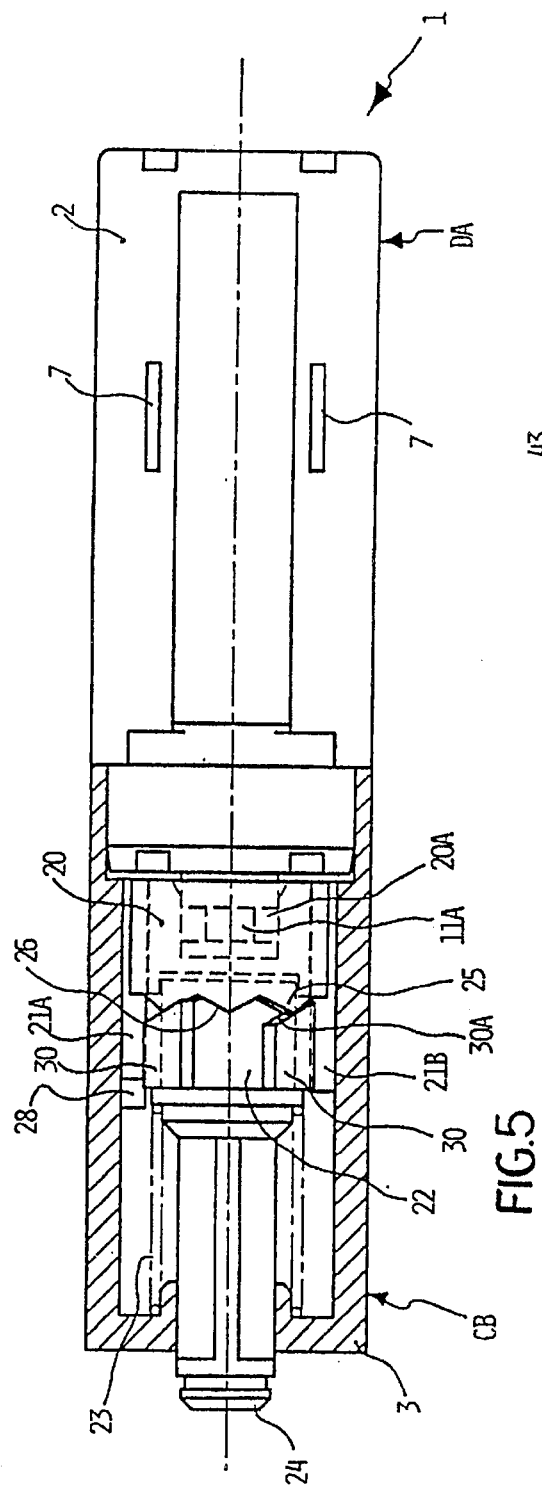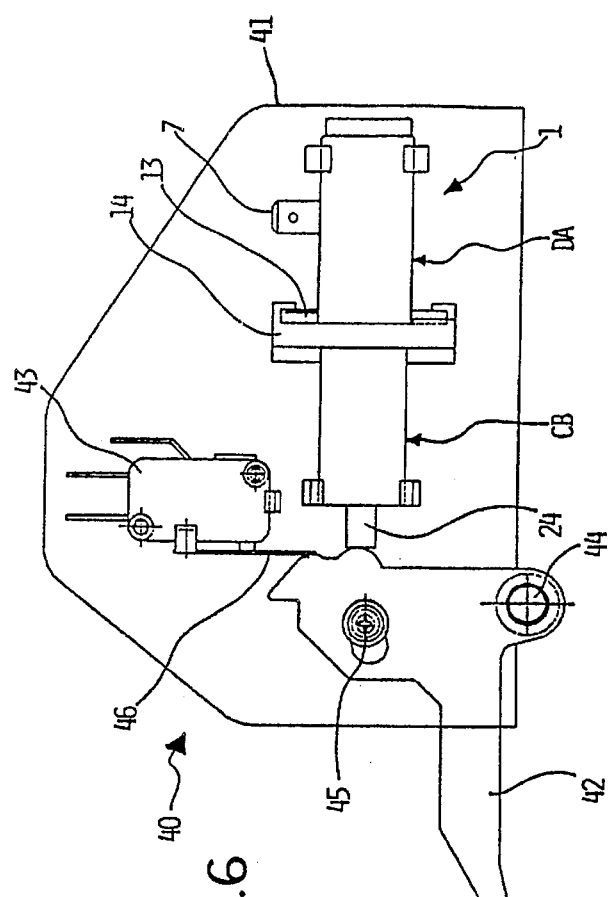
FIG.5
FIG.6

BISTABLE ACTUATOR DEVICE

SPECIFICATION

FIELD OF THE INVENTION

The present invention relates to a bistable actuator, i.e. an actuator device capable of assuming two states, both of which are stable, and in which the commutation between the two different states is commanded by external intervention. In other words, a bistable actuator device is capable, during its first functional cycle, to reach a determined working condition and to maintain it, to then return to the previous working condition, in following a successive functional cycle. Such actuator systems therefore have actuator means and means for maintaining the condition reached on termination of the first functional cycle. The actuator devices of the cited type contrast with those without means for maintaining the position when their energy supply is stopped (monostable actuator systems).

BACKGROUND OF THE INVENTION

Bistable actuator systems in practice are utilized for numerous applications. For example they are used for blocking systems of the doors of electrical household appliances, so as to avoid dangerous operations for the user.

Thermal bistable actuator systems are known, in which the maintaining of the position reached is assured by way of a couple of bimetallic elements. Such known systems however lack appropriate functional control means, so that their way of operating, which is based on ambient temperature, easily results in being affected by external sources of heat.

Electromagnetic bistable actuator systems are also known, that depend upon complex circuitry for controlling the polarity inversion or the electric commutation.

Another typical problem of the known art is that of the complexity of the components making up the bistable devices, and their arrangement. For example the use of electromagnets makes the actuator devices complex, bulky and expensive.

A further problem of known thermal or electric bistable systems if the reduced stroke available, together with the high forces to be used. Normally, with the purpose of obtaining greater forces with devices of contained dimensions, the electric actuator means of devices in use must be sized for a very brief supply time. In such cases there is however the risk that accidental extended times of supply cause the destruction of the actuator device.

OBJECT OF THE INVENTION

The principal object of the invention is to overcome the aforementioned drawbacks and to provide a bistable actuator that is simple, economical and reliable in the most varied conditions of use.

Another object of the invention is a bistable actuator that, even being of very contained dimensions, is able to generate great forces and strokes, and which is able to work with long or short periods of supply and/or insertion.

SUMMARY OF THE INVENTION

These objects are attained according to the present invention by way of an actuator device capable of varying its functioning conditions between a state of rest and a working state, both of which being stable, comprising an actuator element capable of carrying out, by way of an external command, the commutation between the two functional states of the device, and holding means, able to hold the device in the working state. According to the invention, the actuator element is a monostable actuator, in particular of the thermal type, and in that an adapter is provided which makes the actuator a bistable device by way of kinematic motion that assures the holding of the working state even without supply to said monostable actuator.

BRIEF DESCRIPTION OF THE DRAWINGS

The above and other objects, features, and advantages will become more readily apparent from the following description, reference being made to the accompanying drawing in which:

FIG. 2 is a sectioned view of the device according to the invention, taken along the line II—II of FIG. 1;

FIG. 5 is a view, similar to that of FIG. 1, of the device according to the invention, in a second functioning condition; and FIG. 6 is an elevation of the device according to the present invention, in an embodiment which is particularly advantageous.

SPECIFIC DESCRIPTION

Figure 1:
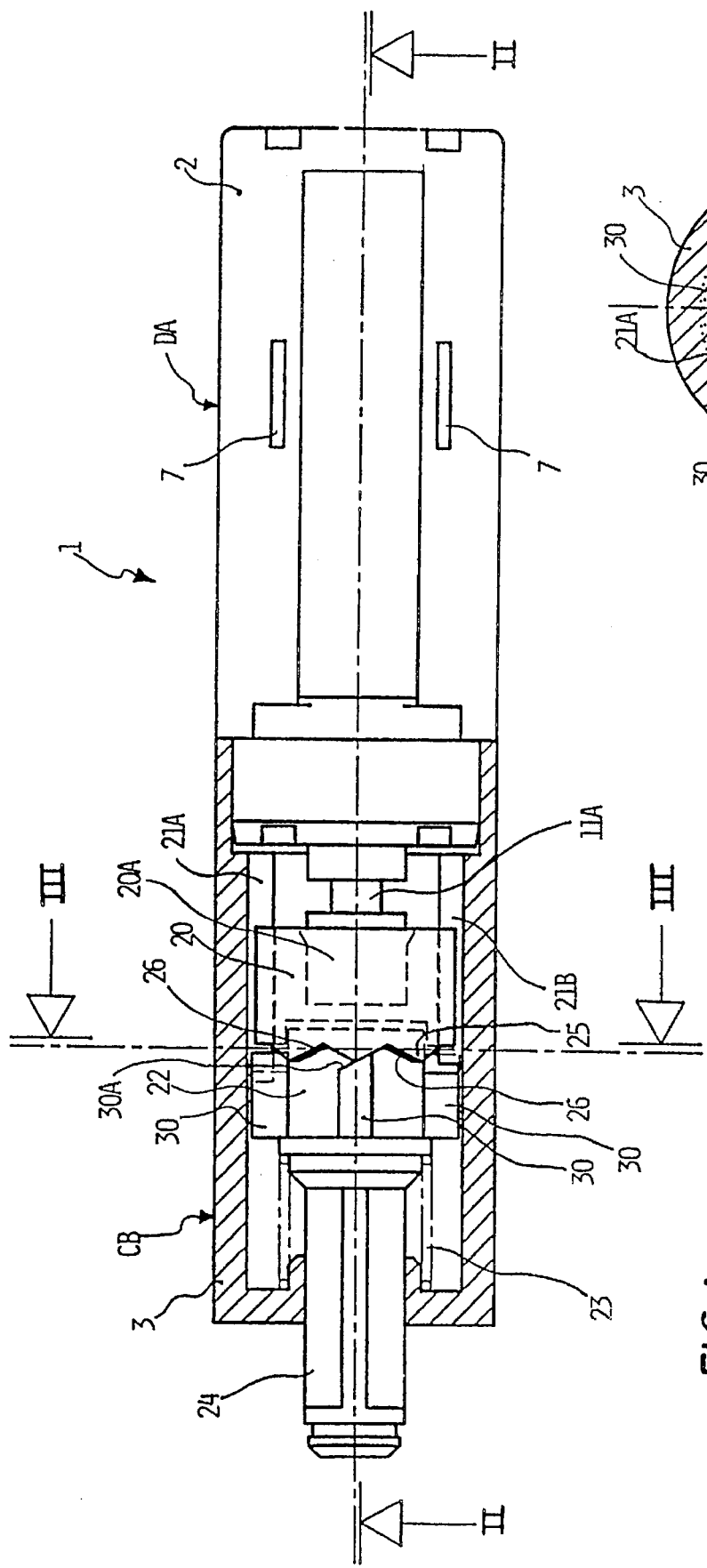
FIG. 1 is a partial sectioned elevation of the device according to the invention, in a first functioning condition.

The bistable actuator device 1 a body 2 in which a monostable type actuator is housed and a substantially tubular shaped body 3 within which kinematic means are housed. The diameter of the body 3 is extremely limited (approximately 17 mm).

As can be seen from FIG. 2, a chamber 4 is defined in the body 2 which houses:

a thermal actuator, or thermoactuator 5, an electric heater 6, for example a positive temperature coefficient registor PTC, arranged in contact with the thermoactuator 5; and two electric supply terminals 7, exiting the body 2.

The thermoactuator 5 comprises a conductive body 8, which is thermally and electrically connected to the heater 6 supplied by two electric terminals 7.

The two terminals 7, the thermoactuator 5 and the heater 6 constitute an electrical heating circuit that, due to the effect of the PTC heater, is self-regulating in its temperature.

In the body 8 of the thermoactuator 5 a sealed chamber is defined, filled with a thermal expandable material 9, for instance wax. In this sealed chamber a small piston 10 is arranged, the extremity 10A of which exits the body 8 of the thermoactuator 5; the expansion of the material 9, when subjected to an increase in temperature (induced by the heater 6 electrically supplied by way of the terminals 7) induces a thrust on the piston 10, and therefore a linear movement of the same, so as that the extremity 10A is spaced from the body 8.

A mobile rod 11 has an extremity 11A extending out of the body 2. The rod 11 is subjected to the contrary reaction of an elastic element, for instance a coil spring 12. The spring 12 acts upon the seat 11B to cause the re-entry of the piston 10 in the thermoactuator 5 upon termination of the heating cycle of the latter.

The thermoactuator 5, the heater 6, the electrical contacts 7, the rod 11, the spring 12 and the body 2 constitute as a whole a thermoelectric monostable actuator device DA, i.e. capable of thrust operating only when electrically supplied, but not able to maintain the position reached once supply is withdrawn.

The body 2 of the thermoelectric actuator device is mechanically coupled to the body 3, being two flanges 13, 14 of the bodies 2 and 3, equipped with a bayonet type hooking system for their mutual joining. Coaxial holes 15, 16 are present in the flanges for fixing the device 1 to another device. The distance between the hooks 15, 16 visible in the upper and lower part of the figure is approximately 26 mm.

The body 3 is internally equipped with a bistable kinematic mechanism, i.e. capable motion, i.e. apt at of maintaining the working position reached, determined by the activation of the thermoactuator 5, even upon termination of the supply to the latter. The body 3 and the said internal kinematic mechanism therefore constitute a bistable adapter CB, apt at transforming the monostable actuator DA in the bistable actuator device 1.

The bistable kinematic motion comprises a sliding cursor element 20 linearly slidable within the body 3, and restrained in its movement by a pair of appropriate guides 21A and 21B obtained as protrusions on the internal wall of the body 3. A mobile element 22 also linearly slidable within the body 3, is caused to rotate by the thrust of the sliding cursor 20. An elastic element 23 such as a spiral spring acts between the extremity of the body 3 and the rod 24, partially inserted in the mobile element 22.

The guides 21A and 21B, the sliding cursor and the element 22 have a system of inclined planes and/or cams able to transform the linear movement of the piston 10, of the rod 11 and of the sliding cursor 20 in a rotary movement of the mobile element 22.

Figure 4:
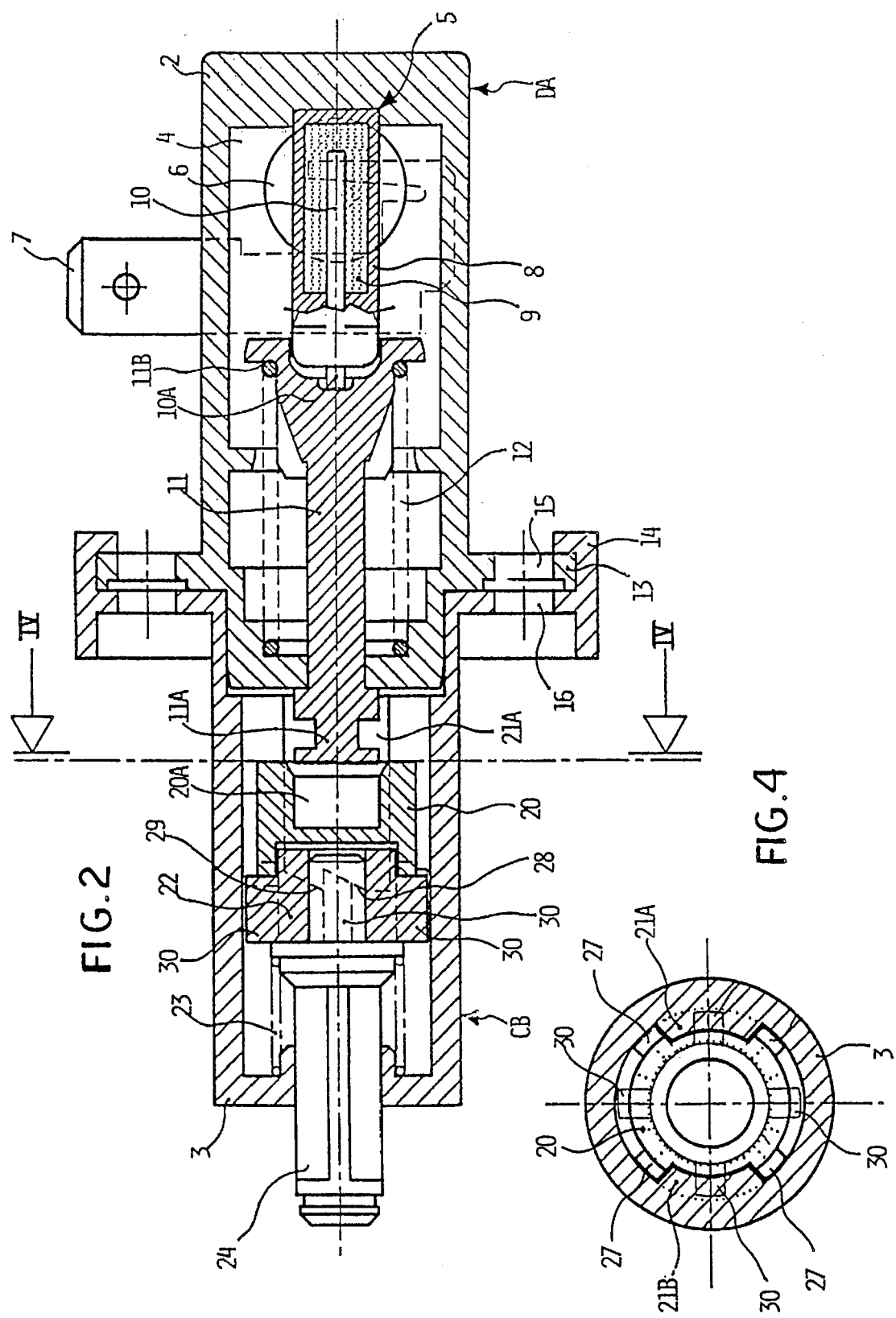
FIG. 4 is a sectioned view of the device according to the invention, taken along the line IV—IV of FIG. 2.

The sliding cursor 20, of a circular section, has at one of its extremities a seat 20A capable of receiving the extremity 11A of the rod 11. On the edge of the opposite extremity of the sliding cursor 20 small teeth 25 are provided (FIG. 1), that therefore create a series of inclined planes 26. On the external surface of the sliding cursor 20 four radial contours are also defined. As seen in FIG. 4, these contours 27 cooperate with the guides 21A and 21B of the body 3 for permitting only a linear movement of the sliding cursor 20. As can be seen in FIG. 2, the two guides 21A also have an edge provided with inclined planes, indicated with 28 and 29.

Figure 3:
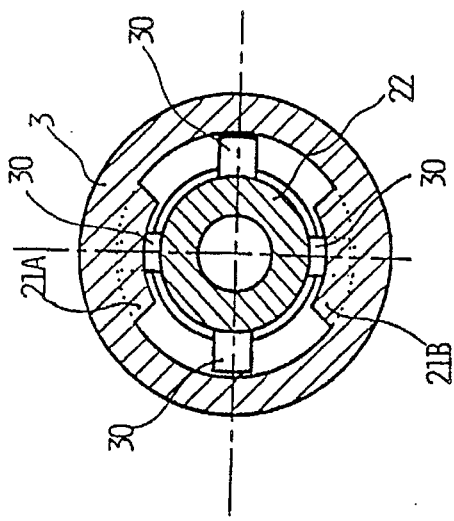
FIG. 3 is a sectioned view of the device according to the invention, taken along the line III—III of FIG. 1.

The mobile element 22 has in its lower part a circular section of a diameter being less than that of the sliding cursor 20, from which four radial teeth 30 are obtained (see FIG. 3), of a length being less than that of the overall mobile element 22; the extremity 30A of such teeth 30 pointing towards the sliding cursor 20 is not flat, but inclined.

As can be seen from FIGS. 1, 2 and 5, the mobile element 22 is capable of being partially inserted in the sliding cursor 20. To the mobile element 22 an extremity of the said rod 24 is then introduced. Its other extremity exits from the body 3.

The forms and dimensions of the details 20 and 22, the guides 21A and 21B and of the body 3 are calculated so as that the sliding cursor 20 is guided, by way of the guides 21A–21B and contours 27, to slide for all its linear movement, and the mobile element is guided, by way of the guides 21A–21B and teeth 30, only for a limited section of its path.

The functioning of the device subject of the present invention is described in the following; to such purposes it is to be noted that the initial condition of the device is that as illustrated in FIG. 5.

The thermoactuator 5, when not electrically supplied by way of the terminals 7, is subject to the reaction of the spring 12, the force of which is greater than the thrust exercised on the piston 10 by the material 9, when this is not heated. In such condition the extremity 10A of the piston 10 is in a withdrawn position.

When the terminals 7 are connected to a source of electrical supply, the heater 6 (PTC) heats, thermo-adjusting automatically its temperature. The heat thus created is transferred by contact to the body 8 of the thermoactuator 5, and therefore to the expandable material 9 contained within the sealed chamber.

The increase of temperature of the thermoactuator 5 determines an increase in volume of the expandable material 9 and therefore a thrust on the piston 10; it is to be noted that the temperature and the relation between the volume of the sealed chamber and the volume of the expandable material 9 is appropriately calculated, so as to allow a precise increase in pressure and to enable movement of the piston 10 and the rod 11 without exceeding in thrust.

The extremity 10A of the piston 10 pushes the rod 11, which in turn operates a thrust on the sliding cursor 20. This sliding element 20 therefore linearly slides in the guides 21A and 21B, integral with the body 3, and thrusts, with its inclined planes 26, the inclined extremity 30A of the teeth 30 of the mobile element 22.

The mobile element 22 also slides in a linear manner, restrained by the guides 21A–21B and contours 30, but only for a brief section (for example during the first phase of the actuation cycle), also moving linearly the rod 24 in contrast to the action of the spring 23. The resulting force on the rod 24 corresponds therefore to the difference between the force of the thermoactuator 5 and the contrary forces of the springs 12 and 23.

The mobile element 22 moves in a linear manner until is not pushed by the sliding cursor 20 over the extremity of the guides 21A and 21B, or better until its teeth 30 are no longer restrained by the guides 21.

Thus, in the terminal part of its run (i.e. some instants before the interruption of supply to the thermoactuator) the mobile element 22 is no longer restrained by the guides 21A and 21B; at this point, the thrust between the inclined planes 26 of the sliding cursor 20 and the inclined extremity 30A of the teeth 30 of the mobile element 22 generates on the latter a transversal component no longer affected by the guides 21A and 21B. This transversal component causes a rotary motion of the mobile element 22, with an angular movement of 15°: such rotary movement brings the inclined planes 20A of the two teeth 30 opposite to rest on the inclined planes 28 of the two guides 21A and 21B.

Upon termination of the electrical supply, the heater 6 and the thermoactuator 5 cool down, the consequent reduction of the pressure inside the sealed chamber and the interruption of the thrust on the piston 10. The force of reaction of the spring 12 therefore determines a return of the rod 11 in the withdrawal position, that in turn ceases the thrust on the sliding cursor 20. As a consequence the thrust on the mobile element is also ceased, and thus on the rod 24.

At this point the reaction of the spring 23, that operates on the rod 24, determines a contrary thrust on the mobile element 22; the inclined extremity of the teeth 30 push therefore on the inclined planes 28 of the guides 21.

Such pressure causes the sliding of the inclined extremity of the teeth 30 on the inclined plane 28 (that therefore functions as a slide), i.e. a second rotary movement of the mobile element 22, with its one further angular movement of approximately 30°, until it arrives at the point visible in FIG.

2. In the condition illustrated in FIG. 2 (also in FIG. 1), therefore, the device is no longer electrically supplied, but the working position reached by the rod 24 is maintained.

The commutation, i.e. the change of the balancing state of FIG. 2, is obtained with a successive electrical supply of the device.

Such new supply determines, in a way similar to that already described, a new thrust of the sliding cursor 20, that freely slides along the guides 21 until it contacts the inclined planes 26 on the inclined extremities 30A of the two teeth 30; in particular such two teeth 30 are those which for the moment are not employed on the extremities of the guides 21A and 21B.

The relative thrust permits the extremities 30A of the other two teeth 30 to free themselves from the inclined planes 28 of the guides 21A and 21B, that generates a new traversal component capable of causing a rotary motion of the mobile element 22; in this way an angular movement of approximately 15° is obtained that permits the inclined extremities 30A of the teeth 30 to reach in support the inclined planes 29 of the guides 21A and 21B.

With the successive termination of the electrical supply to the actuator 5, as described above, the return is determined of the withdrawal position of the rod 11 that ceases the thrust on the sliding cursor 20, and thus on the mobile element 22. As a consequence the reaction of the spring 23, that operates on the rod 24, a contrary thrust is applied to the mobile element 22. The thrust of the inclined extremity 30A of the teeth on the inclined planes 29 causes a rotary motion of the mobile element 22, with a further movement of 30°.

In such situation the teeth 30 return therefore to the initial position, i.e. of restraining the linear sliding by way of the guides 21A and 21B, in such a way that, under the thrust of the spring 23, the withdrawal of the rod 24 is permitted.

We are therefore returned to the position illustrated in FIG. 5.

It is to be noted that the particular configuration described, with an adapter CB equipped with the said system of inclined planes and/or cams, allows for obtaining a bistable system of greatly reduced dimensions. Moreover, in the case described, the power characteristics of the thermoactuator 5 allow for managing high loads. As a consequence the monostable actuator DA can therefore easily be transformed to a bistable actuator, in a simple and modular manner by way of said adapter, inasmuch the components illustrated DA and CB can be assembled and tested separately.

In FIG. 6 the bistable actuator device of the present invention is represented in an embodiment being particularly advantageous, i.e. in an application to door blocking for electrical household appliances, such as washing machines and/or cooking ovens. This safety system is particularly useful in the case of washing machines for avoiding opening of the door during use, and in the case of cooking ovens for avoiding opening of the door for example during pyrolysis cleaning procedures.

In FIG. 6, the door blocking device as a whole is indicated at 40, and body 41, a door blocking element 42 and a micro-switch 43, for the detection of the various functional conditions.

The device 1 according to the invention is mounted on a housing body 41 and its rod 24 operates, in the above described manner, on the blocking element 24, which is hinged at point 44 and limited by restraints at point 45. The micro-switch 43, by way of its lever 46, detects the two working positions of the element 42.

From the given description the characteristics of the device subject of the invention are clear, as are its advantages.

In particular, in the described embodiment the use of a thermoactuator 5 allows for developing considerable power with the aim of moving even heavy loads, for example in the order of 20 kg, even though being of greatly reduced dimensions. The body 23 of the illustrated device 1 has in particular the following dimensions: mm 17×18.5×71.5 (flange 13 and 14, terminals 7 and rod 24 excluded).

The use of an electric heater 6 of the PTC type allows thermo-adjustment of the actuator 5 without the addition of other control systems, and therefore yields a precise control of the actuation device at a low cost.

The use of a thermoelectric actuator, comprising a thermoactuator 5 and a PTC electric heater 6, allows powering of the system independently from the voltage supply, while maintaining a low level of energy consumption.

The bistable kinematic motion (CB) allows for a further saving in energy, during the long actuation cycles of the device 1, inasmuch it operates in working and/or rest conditions with short supply cycles.

The particularly inclined planes and/or cam structure of the kinematic system provide a simple bistable mechanical system, of reduced dimensions and of high reliability, able to maintain the thrust on great loads, also in the case of sporadic increases of the forces exercised on the rod 24.

The relatively slow insertion times, normally at several seconds, allow for eliminating vibrations or noise during the supply cycle.

The modularity of the system allows production and separate testing of the actuator and bistable parts, with a reduction of costs due to production waste.

The device according to the invention thus finds a field of application for greater than devices of the type known, in that it functions correctly in the most varied conditions of use, in small spaces, without sophisticated control systems, with great loads and however with both high and low voltage supplies.

It is clear that numerous variants are possible by the man of the art to the device described as an example, without for this departing from the novelty principles inherent in the inventive idea.

Furthermore it is clear that the bistable actuation device illustrated and described in an application of a door blocking systems for electrical household goods could advantageously be utilised for various uses, such as for example the opening/closing of air circulating flaps in no-frost refrigerators, or together with valves. In the second case, the device according to the invention allows for avoiding, due to its relatively slow insertion times, phenomena of turbulence normally known as "water hammering".

What is claimed is:

1. A linear actuator capable of varying a functional state between a stable state of rest and a stable working state, comprising:
   an actuator unit including:
   a housing,
   an electrically-activatable heating element in said housing,
   a first shaft linearly displaceable in said housing for axial outward movement from said housing and inward movement into said housing, and
   an actuator body in said housing in thermal contact with said heating element and acting upon said first shaft for inducing axial outward movement of said first shaft when said actuator body is heated upon electrical activation of said heating element and axial inward movement of said first shaft when said heating element is electrically deactivated; and a mechanism for converting linear movement of said first shaft into bistable actuation, said mechanism comprising:

a second shaft aligned with said first shaft, a spring acting upon said second shaft and biasing said second shaft inwardly, said second shaft being capable of outward axial movement against the forces of said spring, an enclosure receiving said second shaft and said spring and formed internally with a plurality of guides between said first shaft and said second shaft, a first element slidable axially in said enclosure between said first shaft and said second shaft and prevented from rotation by said guides, and a second element juxtaposed with said first element and slidable and rotatable in said enclosure, said first and second elements having teeth with inclined surfaces mutually engageable to rotate said second element upon engagement of said first element with said second element under a thrust applied by said first shaft, said second element having formations engageable with ends of said guides for retaining said second element and said second shaft in said working state after a first displacement of said elements by said first shaft whereby a successive displacement of said elements by said first shaft enables said formations to clear said guides and said spring to retract said second shaft.

2. The actuator defined in claim 1 wherein said actuator body is a thermo-actuator comprising a chamber filled with a thermally-expandable wax and a piston received in said chamber and extending from said chamber into engagement with said first shaft.

3. The actuator defined in claim 1 wherein said enclosure and said housing are separable from one another to respectively separate said actuator unit from said mechanism and have a bayonet joint for interconnecting said actuator unit and said mechanism.

4. The actuator defined in claim 1 wherein said guides at said ends are formed with inclined planes.

5. The actuator defined in claim 1, further comprising means operable by said second shaft for blocking a door of an electrical appliance.

6. The actuator defined in claim 1, further comprising means operable by said second shaft for actuating an air circulation flap in a no-frost refrigerator.

7. A linear actuator capable of varying a functional state between a stable state of rest and a stable working state, comprising:

an actuator unit having a housing and an electrically-operable means within said housing for displacing a first shaft to extend said first shaft from said housing upon electrical actuation and retract first shaft into said housing upon electrical deactivation;

a mechanism for converting linear movement of said first shaft into bistable actuation, said mechanism including an enclosure aligned with said housing and having a second shaft extending from said enclosure and means in said enclosure for converting successive linear displacements of said first shaft into shifting of said second shaft between states and retention of said second shaft in said states; and means for connecting said housing and said enclosure together for transforming actuation of said first shaft into bistable operation.

8. The actuator defined in claim 7 wherein said means in said housing includes a chamber filled with a thermally-expandable material which, upon heating, displaces said first shaft.

9. The actuator defined in claim 7 wherein said means in said enclosure includes two elements juxtaposed with one another and coupled by inclined teeth on said elements for rotating one of said elements upon axial displacement of another of said elements by said first shaft.

10. The actuator defined in claim 7, further comprising means operable by said second shaft for blocking a door of an electrical appliance.

* * * * *